Dec. 22, 1970    A. KALLINIKOS    3,549,195
DRIVER PROTECTIVE APPARATUS FOR TAXICAB
Filed July 3, 1968    2 Sheets-Sheet 1

INVENTOR.
ANTHONY KALLINIKOS

Dec. 22, 1970   A. KALLINIKOS   3,549,195
DRIVER PROTECTIVE APPARATUS FOR TAXICAB
Filed July 9, 1968   2 Sheets-Sheet 2
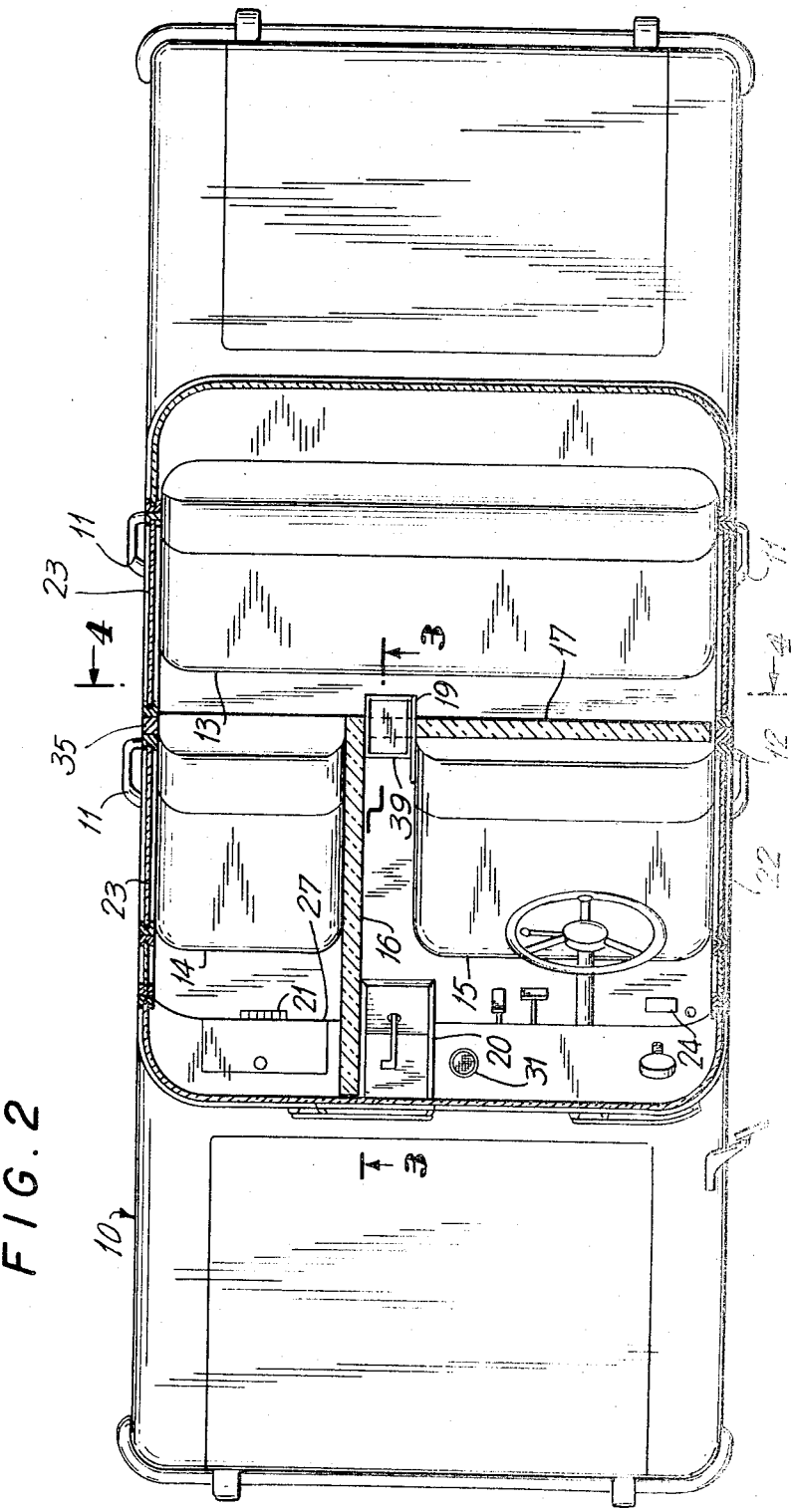
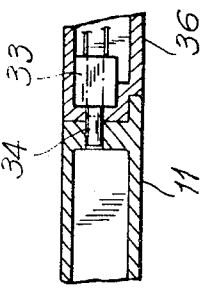
FIG. 5
FIG. 2
INVENTOR.
ANTHONY KALLINIKOS
By

United States Patent Office 3,549,195
Patented Dec. 22, 1970

3,549,195
DRIVER PROTECTIVE APPARATUS FOR TAXICAB
Anthony Kallinikos, 905 E. 15th St., Brooklyn, N.Y. 11230
Filed July 9, 1968, Ser. No. 743,450
Int. Cl. B60r 21/12
U.S. Cl. 296—24      8 Claims

ABSTRACT OF THE DISCLOSURE

An apparatus for protecting the driver of a taxicab from injury from his passengers, consisting in part of an L-shaped shatterproof partition which allows passengers to ride in the front seat of the vehicle while the driver is still protected. The partition includes a slot for receiving payment from the passengers, and further, is contoured in design to permit the free circulation of air throughout the interior of the vehicle. The passenger doors of the vehicle are automatically locked by solenoids controlled by the driver, and the windows are prevented from opening more than half way so that the driver can detain the passengers for possible apprehension for criminal acts.

---

This invention relates to improvements in vehicle protection and particularly an apparatus for protecting taxicab drivers from malicious passengers.

More specifically, this invention relates to a plurality of improvements to a taxicab vehicle which protect the driver from robbery and aid in the apprehension of criminal type passengers.

Taxicabs and other vehicles for hire are in some cases presently provided with protective shields across the back of the driver's seat in order to physically separate the driver from his passengers. With the large increase in robberies of taxicabs and other vehicles for hire, these conventional shields have been found to be inadequate in protecting the driver from serious injury from malicious passengers. Moreover, once the robbery has taken place, it is difficult for the driver to capture or recognize his assailants. In many cases, the robbers use the taxi vehicle to effect their getaway after taking the control of the car away from the driver. Furthermore, the conventional protective shields generally exclude passengers from riding in the front seat of the cab so that it becomes difficult to carry more than three passengers in the taxicab without jeopardizing the security of the driver.

Accordingly, the present invention provides a plurality of improvements which overcome many of the inherent disadvantages of conventional protective shield devices while permitting additional passengers to ride in the front seat of the vehicle. The apparatus of the invention includes a shatterproof protective shield which is L-shaped in design and surrounds the driver on two sides. The taxicab is also provided with automatic locks to the passenger doors of the vehicle which permit the driver to lock the passengers within the vehicle to prevent escape. Moreover, the windows of the vehicle which are accessible to the passengers are restrained from being opened more than halfway to prevent the passengers from escaping while the doors are locked. The driver can communicate and receive payment from his passengers by means of a cash window which is inserted in one of the shatterproof partitions separating the driver from the passengers.

The invention further provides adequate ventilation between the passenger and driver compartments by including a plurality of passageways along the periphery of the partition to permit air to circulate freely through the vehicle.

It is therefore an object according to the present invention to provide a protective apparatus for use in a vehicle which isolates the driver from the criminal acts of his passengers.

It is another object according to the present invention to provide a protective apparatus which enables the driver to capture suspected criminals within the passenger compartment of the vehicle.

It is still a further object according to the present invention to provide a protective apparatus for a moving vehicle which is simple in design, easy to manufacture and which is readily adaptable to existing as well as new vehicles.

Other objects and features of the present invention will become apparent from the following detailed description considered in connection with the accompanying drawings which disclose the embodiments of the present invention. It should be understood, however, that the drawings are designed for the purpose of illustration only and not as a definition of the limits of the invention as to which reference should be made to the appended claims.

In the drawings wherein similar reference characters denote similar elements throughout the several views:

FIG. 2 is a cross sectional view taken along section section 2—2 of FIG. 1;

FIG. 5 is a cross sectional view taken along section 5—5 of FIG. 1.

Figure 1:
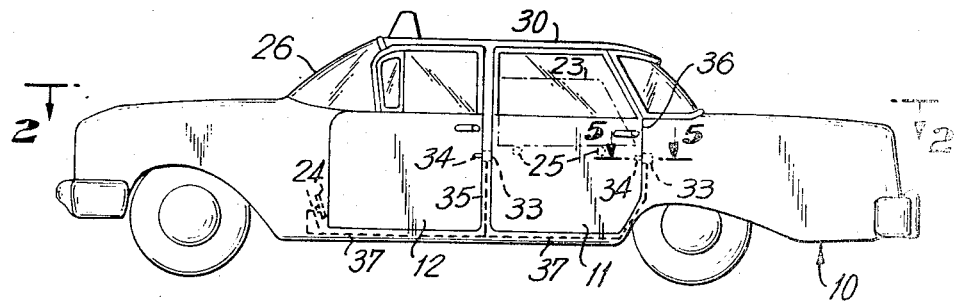
FIG. 1 is a side plan view partly in cross section of a vehicle containing the apparatus of the invention.

Referring to FIGS. 1–4, there is shown a typical vehicle 10 such as a taxicab having three passenger doors 11 which provide access to the back seat 13 and the right hand front seat 14. Leading to the driver's compartment is a door 12 to provide access to the driver's seat 15. Surrounding the driver's compartment is an L-shaped section of shatterproof (bulletproof) glass consisting of section 17 secured adjacent to the backside of driver's seat 15, and section 16 extending from the end of section 17, between seats 14 and 15, to the dashboard 27 of the vehicle. In the driver's compartment, the dashboard includes the taxi meter 20 which is visible by the passengers in the rear seat through glass partitions 16 and 17. Dashboard 27 also includes a vent 31 for permitting air to circulate within the driver's compartment. The front passengers' compartment is also provided with air ventilation of air conditioning produced by a vent 21 mounted within dashboard 27.

Figure 3:
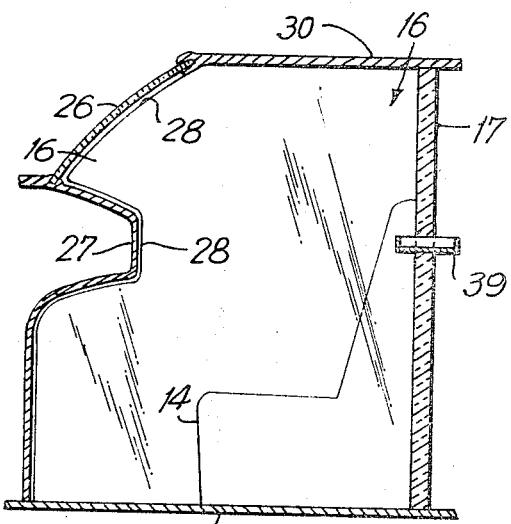
FIG. 3 is a cross sectional view taken along section 3—3 of FIG. 2.

Referring specifically to FIG. 3, there is shown in detail the mounting of shatterproof glass partition 16 to the front of the vehicle. Partition 16 is secured between the floor 29 and the ceiling 30 of the vehicle against the edge of partition 17, and extends in a contoured shape along the windshield 26 and dashboard 27 at the front of the vehicle. The glass of partition 16 is cut so that a small crack 28 separates the glass from the windshield and dashboard to permit air ventilation from vents 21 and 31 to circulate throughout the vehicle.

Figure 4:
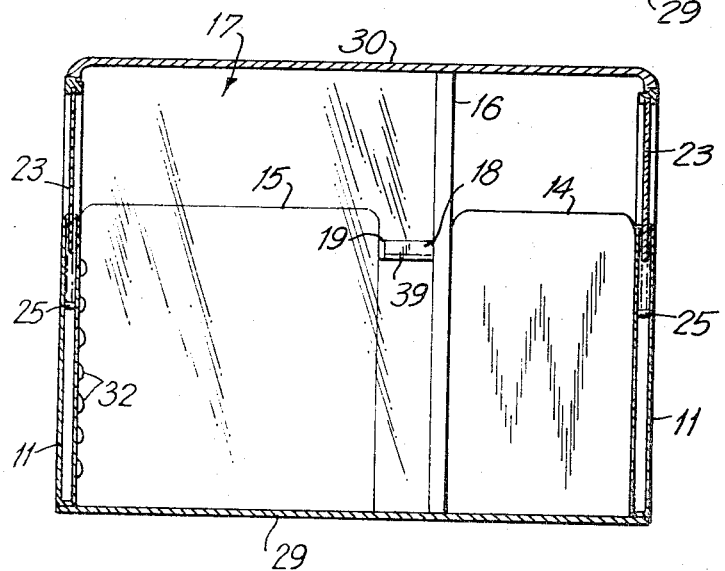
FIG. 4 is a cross sectional view taken along section 4—4 of FIG. 2.

Referring to FIG. 4, there is shown a plan view of partition 17 secured between floor 29 and ceiling 30 of vehicle 10. Partition 17 includes a plurality of cut outs 32 along its edge adjacent to the side of the vehicle, to permit air to circulate from the passenger compartment to the driver's compartment. Adjacent to the side of driver's seat 15, partition 17 is provided with a narrow slot 18 which is sufficiently wide to permit the driver to collect his fare from the passengers and receive oral instructions as to the place of destination. Slot 18 includes a tray 39 for momentarily containing the fare when it is deposited therethrough. Slot 18 also includes a partition 19 against its side adjacent to the driver's seat 15 to shield the driver from any objects which the passengers may attempt to insert through the slot. Shield 19 also prevents a direct line of sight from being established through slot 18 to the driver of the vehicle in the event that the passenger may attempt to use a weapon against the driver.

The vehicle is also fitted with automatic door locks which consist of solenoids as shown in FIG. 1 and FIG. 5 which are communicative to the passenger doors 11. The protection apparatus includes three solenoids wherein two are connected within rear body post 36 of the car so that their plungers 34 can project into corresponding holes in the two rear doors 11, while the third plunger is mounted in post 35 on the right side for contact with the front right passenger door 11. The door 12 on the driver's side of the car is not provided with any solenoid lock so that the driver has independent control in entering and leaving the vehicle. Each of the solenoids 33 are electrically connected by means of a cable 37 to a foot switch 24 mounted in a convenient location on the floor of the driver's compartment. It is therefore possible for the driver to actuate switch 24 and to lock all three of the passenger doors simultaneously by means of solenoids 33.

Each of the passenger doors 11 are additionally provided with window stops 25 which prevent the passenger windows 23 from being lowered more than halfway so that the passengers cannot escape through the windows when the doors are automatically locked by the driver. The stops 25 are secured within each of the doors 11 so as to interfere with the bottom edge of window 23 when attempts are made to lower the window more than halfway. In the driver's door 12 there is also provided a window 22 which may be raised or lowered to any height by the driver. To prevent the passengers, however, from reaching the driver from the back windows, window 22 is made of shatterproof glass so that the driver can maintain window 22 closed and be completely protected from assault by his passengers.

When passengers enter the vehicle through either of the three doors 23, the driver can lock the doors immediately by actuating switch 24 and thus prevent the passengers from leaving the vehicle without paying their fare. Should the passengers attempt to rob or assault the driver, the driver can maintain the passengers locked within the cab and summon help by driving to the nearest telephone or police station. The passengers will be unable to escape through the windows or the doors of the vehicle until the driver releases solenoid 23 so as to unlock the doors. The embodiments of the invention may be easily installed into both new and existing vehicles in a relatively short time. Unlike conventional protection systems, the protection apparatus of the invention permits passengers to ride in the front seat of the vehicle so that the taxicab can accommodate at least four persons. The shatterproof glass partition protects the driver from being stabbed or shot at by deadly weapons in the hands of his passengers. The protective apparatus not only protects the driver from injury and assault from his passengers but also permits the driver to participate in the apprehension of criminal passengers.

While only a few embodiments of the present invention have been shown and described, it will be understood that many changes and modifications may be made thereunto without departing from the spirit and scope of the invention as defined by the appended claims.

What is claimed is:
1. A driver protection apparatus for a passenger carrying vehicle including passenger doors having windows comprising;
   a non-breakable substantially L-shaped shatterproof glass partition surrounding the driver of the vehicle and excluding the passenger areas of the vehicle,
   electrical locking means coupled to the passenger doors, said locking means including an electrical switch disposed adjacent to the driver for locking and securing said doors,
   a slot communicative from said driver's compartment to said passenger's compartment for exchanging payment of fare and directions of travel, said slot being disposed in said L-shaped partition, and
   means for preventing said passenger windows from opening more than a pre-determined level, said pre-determined level being sufficient to block the exit of passengers through said windows.
2. The apparatus as recited in claim 1 wherein said L-shaped section comprises ventilation cut outs along one edge adjacent to the side of the vehicle for permitting the free circulation of air throughout the vehicle.
3. The apparatus as recited in claim 2 wherein said window preventive means comprises a plurality of stops inserted into each of said passenger doors to restrict the movement of said windows below a predetermined level.
4. The apparatus as recited in claim 3, wherein said locking means comprises a plurality of solenoids secured within the body of the car adjacent to each of said passenger doors so as to permit the plunger of the solenoid to engage each of said doors to prevent movement thereof.
5. The apparatus as recited in claim 4, additionally comprising a switch mounted in the driver's compartment of the vehicle and electrically connected to each of said solenoids for providing actuation thereof.
6. The apparatus as recited in claim 5 wherein said slot in said partition additionally comprises a shield adjacent to the driver's seat for protecting the driver from a direct line of sight with his passengers.
7. The apparatus as recited in claim 6, additionally comprising air vents located in the passenger and driver compartments for effecting circulation of air throughout the vehicle.
8. The apparatus as recited in claim 7, wherein one edge of said shatterproof partition extending toward the front of the vehicle is countoured adjacent to the interior of the vehicle to provide a narrow passageway so as to permit the circulation of air between the passenger and driver compartments.

References Cited

UNITED STATES PATENTS

| | | | |
|---|---|---|---|
| 3,044,823 | 7/1962 | Oishei | 296—155X |
| 3,397,005 | 8/1968 | May | 296—24 |
| 3,169,599 | 2/1965 | Johnston | 296—24X |
| 1,611,248 | 12/1926 | Smith | 296—24 |

PHILIP GOODMAN, Primary Examiner

U.S. Cl. X.R.

180—82